July 23, 1935.　　　　O. REHDER　　　2,008,876
DEVICE FOR STARTING AND STOPPING AN ELECTRICALLY
DRIVEN CINEMATOGRAPHIC PROJECTION APPARATUS
Filed Aug. 24, 1933
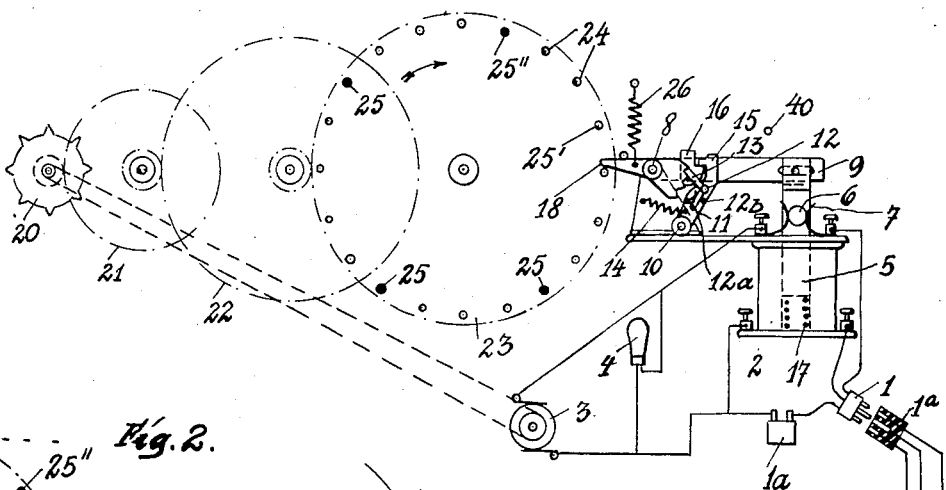
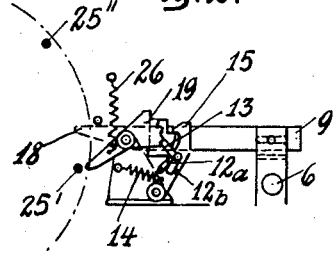
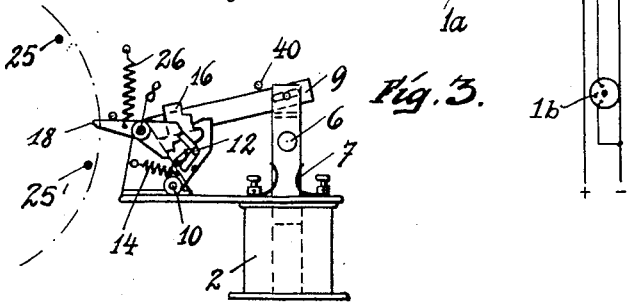

Patented July 23, 1935

2,008,876

UNITED STATES PATENT OFFICE 2,008,876

DEVICE FOR STARTING AND STOPPING AN ELECTRICALLY DRIVEN CINEMATOGRAPHIC PROJECTION APPARATUS

Otto Rehder, Hamburg, Germany

Application August 24, 1933, Serial No. 686,573
In Germany May 11, 1931

1 Claim. (Cl. 88—17)

It has often been endeavoured to show only a certain length of a film strip by means of special arrangements on cinematographic projection apparatus, that is to determine as desired the length of film to be run through the apparatus.

For example, the driving mechanism for the film strip is engaged and disengaged by mechanical arrangements after a certain length of a certain film has run through the apparatus, the current supply to the motor being maintained. There are likewise devices, which are equipped only for the automatic unwinding of a film of certain lengths for film lengths of accurately similar size. These can therefore not be employed for the automatic exhibition of films of any length, which contain a sequence of different scenically coordinate film lengths.

Finally, a device is known, for driving and reversing the driving mechanism for automatic cinematographic projection apparatuses in which the film length to be unwound is adjusted on a counting mechanism and, when this length has unwound, the film feed is reversed so that the film strip is again wound. Consequently, a fresh adjustment of the counting mechanism must be carried out as soon as the length of the film or picture strip changes. An automatic drive for different film or scenic lengths can therefore likewise not be employed in this instance.

The differences between the known arrangements and the invention will be apparent after perusal of the following description. The invention endeavours to generally solve the problem; it has for its object to successively exhibit scenic lengths after automatically stopping the preceding length, independently of the film or scenic length and in conjunction therewith to automatically switch out the motor and light after each complete unwinding and to again switch in the driving mechanism and current before commencing the next exhibition, for example by insertion of a coin.

The invention consists in that the projection apparatus is provided with an electromagnet controlling the common circuit of the projection lamp and the driving motor, which magnet is indirectly influenced in such a manner that after a certain length has run through the apparatus, the film can be automatically stopped at several predetermined points and at the same time again made ready for releasing the unwinding of the next following length or section.

An embodiment of the invention is illustrated, by way of example, in the accompanying drawing in which:—

Fig. 1 shows in side elevation a device with circuit diagram.

Figs. 2 and 3 show the different positions of the lever mechanism.

A plug 1 (Fig. 1) is inserted in a socket 1a which is connected with a coin receiving box or press button circuit closer 1b which does not form part of the invention. Leads extend, as shown in Fig. 1, from this plug to a magnet coil 2, through a resistance 1a to a driving motor 3 and an element 4 for illuminating the film. If the adjusting device on the coin receiving box is set to the mark "picture", the current passes into the coil 2 which attracts an iron core 5. This core has a brass shod fibre knob 6 which, when the iron core is pulled downwards, passes between two contact springs 7 and closes the circuit for the motor 3 and the light 4.

A lever 9, pivotally mounted on a pin 8, is connected to the iron core 5. A pawl 11 is pivotally mounted on a pin 10 and carries a bell crank lever 13 pivotally mounted on a pin 12. The lower arm of the lever 13 presses against a spring 12a and the movement of the lever is limited by an abutment pin 12b. The pawl 11 is pulled towards the left by a spring 14 and has a hook 15 which engages behind an abutment 16 fixed on the lever 9 and holds this lever and the iron core 5 in position, seeing that the latter is pressed upwards by a spring 17. A two armed lever 18 is mounted on the pivot pin 8 the rear portion 19 being serrated. The upper arm of the bell crank lever 13 engages in the teeth of this serrated portion 19.

The film driving wheel 20, which in this instance is provided with points engaging in perforations in the film strip, is driven by the motor 3. A group of transmission wheels 21, 22, 23 are connected to the wheel 20, these transmission wheels being of such dimensions that the last wheel 23 rotates once when the whole film is unwound. The diameter of the toothed wheel 23 is therefore chosen according to the entire length of the film and to the speed of rotation of the motor or of the wheel 20 and the remaining two intermediate transmission wheels. Uniformly spaced perforations are drilled in the reinforced edge of the wheel 23 in which perforations pins 25 are inserted by hand. The number and spacing of the pins depend upon the film length which is to be shown in one operation, or to the insertion of only one coin. If the film comprises for example 6 sections or scenes, and each section is of a different length, the pins are inserted in the wheel 23 according to the lengths of these sections, for example for the unwinding of 15, 20, 30, 18 metres and so forth, as indicated in Fig. 1.

If a pin, for example 25', comes into contact with the lever 18, this lever is slowly depressed as shown in Fig. 2. The rear serrated portion 19 therefore ascends and assumes the position shown in Fig. 2. The pin 25' then liberates the lever 18, which is pulled upwards by the spring 26, and the bell crank lever 13 with the pawl 11 are pushed outwards seeing that the crank lever cannot yield because it abuts against the pin 12b and is held by the spring 12a. Thus, the hook 15, however, is pressed out of the abutment towards the right, so that the lever 9 is disengaged and is swung upwards by the spring 17 (Fig. 3). Thus, the knob contact 6 is pressed out of engagement with the contact springs 7, so that the circuit supplying current to the motor of the apparatus and to the projecting lamp are interrupted. The bell crank lever 13 is pressed upwards by the spring 14 and engages in the tooth gap in the serrated portion 19 of the lever 18, and the hook 15 bears against the abutment 16.

If the circuit is closed by inserting a coin into the coin receiving box, the iron core 5 is again attracted, and the pawl 11 again engages the abutment 16 (Fig. 1), the next portion of the film can unwind until the next following abutment pin 25 again depresses the lever 18. 40 and 41 are abutment pins for the levers 9 and 18.

This device can be employed for film strips with perforated edge and toothed driving wheel.

In the case of films without perforations at the edges recesses arranged in known manner on the edge of the film are employed for directly controlling an apparatus as illustrated by way of example in Figs. 1 to 3.

I claim:—

A device for starting and stopping an electrically driven cinematographic projection apparatus adapted to be started by hand and to be automatically stopped, comprising in combination a projection lamp, a motor, a common circuit for said lamp and said motor, an electromagnet connected up in said circuit and having an armature adapted to close said circuit, a locking device adapted to lock said armature in closing position, a toothed film feed wheel, a transmission gear connected with said toothed wheel, a disc adapted to be driven by said film feed wheel through the intermediary of said transmission gear, pins insertable at different points in the circumference of said disc and adapted to come into contact with said locking device to liberate said armature to break said circuit, stop said motor and extinguish said lamp.

OTTO REHDER.